(12) United States Patent
Villette et al.

(10) Patent No.: US 10,760,244 B1
(45) Date of Patent: Sep. 1, 2020

(54) SYSTEM AND METHOD FOR SUBSURFACE CABLE INSERTION FOR THE PROTECTION OF UNDERGROUND ASSETS

(71) Applicant: Saudi Arabian Oil Company, Dhahran (SA)

(72) Inventors: Thibault Villette, Dhahran (SA); Waheed Alrafaei, Chester (GB); Iqbal Hussain, Birmingham (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/667,541

(22) Filed: Oct. 29, 2019

(51) Int. Cl.
*F16L 1/11* (2006.01)
*E02F 5/10* (2006.01)
*D03D 7/00* (2006.01)
*H02G 3/04* (2006.01)

(52) U.S. Cl.
CPC .............. *E02F 5/102* (2013.01); *D03D 7/00* (2013.01); *F16L 1/11* (2013.01); *H02G 3/0406* (2013.01)

(58) Field of Classification Search
CPC ... F16L 1/11; F16L 1/028; F16L 1/032; E02F 5/10; E02F 5/102
USPC ................................ 405/157, 178, 180, 181
See application file for complete search history.

(56) References Cited

U.S. PATENT DOCUMENTS

| | | | | |
|---|---|---|---|---|
| 3,575,006 A | * | 4/1971 | Rugroden | E02F 5/103 405/182 |
| 3,648,282 A | * | 3/1972 | Kelly | E02F 5/102 340/647 |
| 3,659,426 A | * | 5/1972 | Caldwell | E02F 5/102 405/183 |
| 3,699,693 A | | 10/1972 | Nelkin et al. | |
| 4,014,175 A | * | 3/1977 | Brink | E02F 5/102 405/183 |
| 4,430,022 A | * | 2/1984 | Kinnan | E02F 5/102 172/477 |
| 4,447,173 A | * | 5/1984 | Schultz | A01G 25/06 405/181 |
| 4,461,598 A | * | 7/1984 | Flechs | E02F 5/102 111/165 |

(Continued)

FOREIGN PATENT DOCUMENTS

| | | |
|---|---|---|
| CN | 204217330 U | 3/2015 |
| CN | 108419458 A | 8/2018 |

*Primary Examiner* — Frederick L Lagman
(74) *Attorney, Agent, or Firm* — Leason Ellis LLP

(57) ABSTRACT

Systems and methods for trenchless placement of an underground protective network of intertwined cables for protecting buried assets from accidental damage are disclosed. The system includes an apparatus for towing behind a vehicle and laying a plurality of continuous cables directly underground and interweaving the cables to form a cable network. The apparatus includes a plurality of soil rippers mounted at respective radial positions to a rotating carrier. The rotating carrier rotates about an axis that is at least partially normal to the ground surface. The rippers plow through the ground in the direction of vehicle travel and include a cable-feeding guide for directly and continuously feeding cable out underground during operation. In operation, the combined movement of the soil rippers from rotating the carrier and movement in the direction of travel serves to intertwine the cables deposited by respective rippers forming the protective network of intertwined cables.

16 Claims, 14 Drawing Sheets

(56) References Cited

U.S. PATENT DOCUMENTS

| | | | | |
|---|---|---|---|---|
| 4,637,755 A | * | 1/1987 | Tollefson | E02F 5/102 |
| | | | | 405/174 |
| 4,661,018 A | | 4/1987 | Kinnan | |
| 9,689,143 B1 | * | 6/2017 | Trussell | E02F 5/101 |
| 2002/0136509 A1 | | 9/2002 | Watson | |
| 2020/0003931 A1 | * | 1/2020 | Dunn | G01V 15/00 |

* cited by examiner

SYSTEM AND METHOD FOR SUBSURFACE CABLE INSERTION FOR THE PROTECTION OF UNDERGROUND ASSETS

FIELD OF THE DISCLOSURE

The present disclosure is directed to an apparatus and method for subsurface installation of structures for protecting underground assets from damage. In one particular arrangement, the present disclosure describes a system for subsurface cable insertion and interweaving of the cables to provide a structure for protecting buried assets.

BACKGROUND OF THE DISCLOSURE

The security and safety around underground infrastructures, such as oil and gas transportation pipelines, has become an important endeavor. Many studies show that most damage to pipelines is third-party damage, which refers to damage caused by earth working (e.g., using a digger or excavator) in the vicinity of an existing pipeline, which is insufficiently spotted or insufficiently protected. The Pipeline Research Council International (PRCI) studies on gas pipelines indicated that 40% of pipeline damage incidents are caused by third-party damage.

A high percentage of failures can be attributed to encroachment and this increasing trend is expected to increase as remote areas become urbanized. This is due to the fact that increases in the population and urbanization lead to an increase in development activities including construction and thus increasing the likelihood of third-party damages. Pipeline failure frequencies in developed areas are four (4) times that in rural areas.

Today, concrete is used for the protection of buried pipelines. Pre-fabricated or casted on-site, concretes slabs are attractive because of their robustness and availability of the material. However, concrete slabs are heavy which implies constraints on the necessary devices (cranes, trucks) and on employees operating the protection, as slab handling is risky and requires a minimal number of operators. Another drawback is the difficulty in handling concrete slabs during construction as well as maintenance operation.

Polymer slabs provide a number of advantages compared to concrete slabs. In particular, the weight of polymer slabs is significantly less for an equivalent surface of protection. This lightweight advantage leads to saving cost. Polymer slabs offer increased functionality as well. Installation of polymer slabs and concrete slabs, however, requires digging of a trench, wherein the width of the trench is driven by the pipeline diameter. Typically, the width of the trench will range between one to two meters. After digging the trench, the slabs are installed followed by backfilling the trench.

One alternative to polymer slabs is installation of polymer meshes that resemble woven netting. Although the mesh solution is less resistant than the HDPE slab, a mesh can withstand, for example, a force equal to 210,000N, which is in general sufficiently robust to protect subsurface structures. Protecting subsurface infrastructure with a mesh, however, requires burying a larger mesh than a slab. This is due to the flexibility of the mesh which is compensated through leveraging a larger friction surface between the protection layer and the soil. Hence, the installation of a mesh requires digging of a wider trench than for polymer slabs.

SUMMARY OF THE DISCLOSURE

According to an aspect of the present disclosure, there is provided an apparatus for trenchless delivery a protective network of intertwined cables beneath a surface of ground. In particular, the apparatus comprises a chassis configured to be mounted to a vehicle that, during operation, traverses the ground surface in a direction of travel. The apparatus also includes a rotating carrier supported by the chassis. The rotating carrier is configured to rotate in a first rotational direction about a rotational axis, which extends generally in a normal direction relative to the ground surface. The apparatus also includes at least two soil rippers that are mounted at a top end to the rotating carrier and extend away from the rotating carrier in a downward direction to a bottom end. During operation, the rotating carrier is maintained above the ground surface and the soil rippers are configured to penetrate the ground surface and plow through the ground in the direction of travel. More specifically, each soil ripper includes a cable-feeding guide configured to receive a cable from a cable supply, which is provided near the top end of the ripper. The cable feeding guide is configured to feed the cable out at a point near the bottom end of the ripper. As a result, the ripper incrementally feeds out the cable at a depth beneath the ground surface as the ripper plows through the ground in the direction of travel. Furthermore, as a result of rotation of the carrier and soil rippers and movement of the apparatus in the direction of travel serves to intertwine the cables deposited by respective rippers and forms the protective network of intertwined cables.

According to an aspect of the present disclosure, there is provided a method for trenchless delivery of a protective underground network of intertwined cables beneath a surface of ground. The method comprises the step of moving, with a vehicle traversing the ground surface, a plurality of soil rippers through the ground in a direction of travel. In particular, the soil rippers are configured to penetrate the ground surface and plow through the ground. Additionally, the soil rippers are supported by a rotating carrier at respective radial positions relative to a rotational axis of the carrier.

In addition, during the step of moving the at least two soil rippers through the ground in the direction of travel, the method also includes the step of rotating the rotating carrier about the rotational axis of the carrier, wherein the rotational axis of the carrier extends at least partially in a normal direction relative to the surface. In addition, the method also includes the step of feeding out a plurality of cables under the surface of the ground using the plurality of soil rippers. In particular each soil ripper is configured to continuously feed out a respective cable whereby rotation of the carrier and soil rippers and movement in the direction of travel intertwines the cables deposited by respective rippers to form the protective underground network of intertwined cables.

These and other aspects, features, and advantages can be appreciated from the accompanying description of certain embodiments of the disclosure and the accompanying drawing figures and claims.

BRIEF DESCRIPTION OF THE DRAWINGS

The foregoing and other features of the arrangements of the present disclosure will be more readily apparent from the following detailed description and drawings of an illustrative embodiment of an invention encompassed by the disclosure.

DESCRIPTION OF CERTAIN EMBODIMENTS OF THE DISCLOSURE

Figure 1:
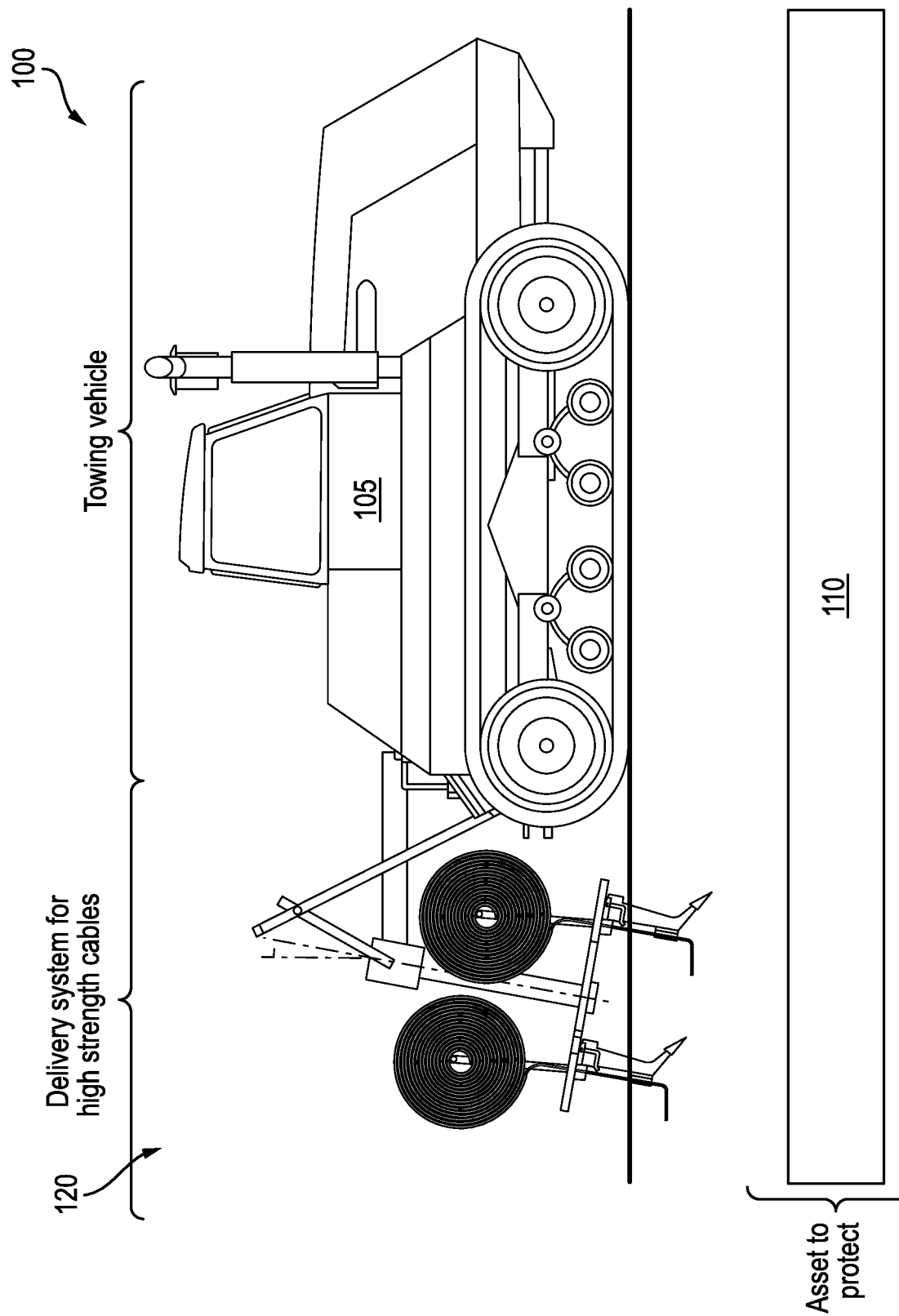
FIG. 1 is a high-level diagram illustrating an exemplary configuration of a subsurface cable insertion system for protecting buried infrastructures according to an embodiment.

By way of overview and introduction, the present application describes devices and methods relating to constructing an underground protection structure for protecting buried assets from accidental damage caused by, for example, an excavator or other such earth working machinery.

Conventional methods for protecting underground assets, such as such as pipelines, electric cabling or fiber optics, includes digging a trench and then laying down protective concrete slabs, polymer slabs or pre-woven polymer mesh blankets. These approaches require significant digging, removal of earth from the area where the protective slabs or blankets are to be installed and then backfilling the earth over the protective structures. As a result, these existing approaches can be labor intensive and costly. Given the drawbacks of existing systems for protecting underground assets, what is needed are protective systems that are more efficiently installed and configured. It is with respect to these considerations that the embodiments herein are disclosed.

The embodiments disclosed herein include systems and methods for trenchless delivery of a protective network of intertwined high-strength polymer cables as well as the resulting underground protection system comprising the protective cable network. The system includes a subsoil delivery apparatus (also referred to as a "subsoil intertwiner"), which can be towed behind a vehicle such as a tractor, and which delivers the cables at a depth under the soil surface and intertwines the cables to form the protective cable network. The systems and methods for installing the cable network and the installed protective cable network itself, as further described herein, provide beneficial and innovative characteristics over existing approaches for protecting underground assets from damage including that the system does not require opening or back-filing a trench. Moreover, the protective properties of the delivered underground protection network can be adapted to application requirements—such as by selectively tuning properties including cable network density, number of physical cable-cable entanglements—and be controlled by the set-up and operational parameters of the delivery system. The protection system described herein minimizes material costs for cable protection. For instance, instead of delivering slabs, the system comprises reinforced ropes or cables and thus requires significantly less material, thereby minimizing costs. Moreover, the protection network can be composed of commercially available cables and, as such, there is no need to manufacture specific equipment such as slab, or mesh. Further, the risks of disrupting cathodic protection of buried pipelines is significantly decreased as the polymer cables defining the cable network are not reinforced with metal and are spaced apart, which better allows the soil's structure to keep continuous conductive properties in the Z direction (which refers to the direction that is normal to the ground surface or vertical direction).

Figure 2A:
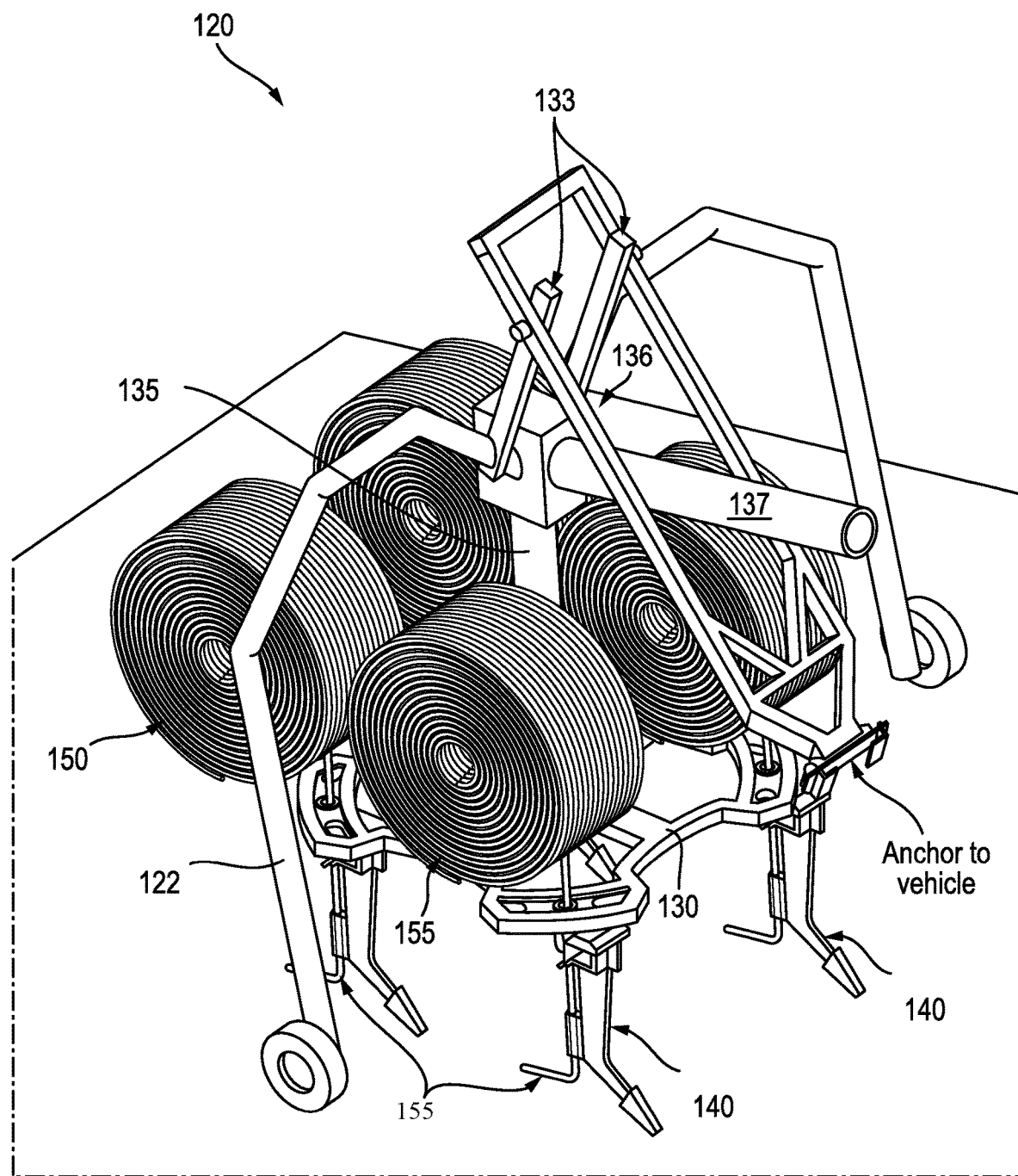
FIG. 2A is a perspective view diagram of an exemplary apparatus for subsurface cable insertion according to an embodiment.

FIG. 1 is a high-level diagram illustrating an exemplary configuration of a subsurface cable insertion system configured to deliver a protective network of intertwined cables according to an embodiment. FIG. 1 shows a lateral view of the system 100 including the towing vehicle 105, such as a tractor, for towing the subsoil intertwiner 120 as well as the underground asset 110 to be protected. FIGS. 2-3 also depict a perspective view and side view, respectively, of the exemplary subsoil intertwiner 120.

A rotating carrier 130 is the central component of subsoil intertwiner 120 and is shown in greater detail in FIG. 2-FIG. 3. As shown, the rotating carrier can be supported by a chassis that can include, for example, one or more stabilizing members 122 suitable for being pulled along behind the vehicle and maintaining the rotating carrier in position during operation. The rotating carrier supports a plurality of soil rippers 140 located below the rotating carrier. The system further includes spool carriers 150 which carry cable spools of cable 155 inserted into the ground by respective soil rippers. As shown, each spool carrier is rigidly connected to the carrier or respective soil ripper, although other spool carrier configurations can be implemented. In one or more embodiment, it can be preferable to use high strength polyethylene cables such as Dyneema® 2 cm diameter cables. Dyneema® is an UHMwPE (Ultra High Molecular weight Polyethylene) or HMPE (High Modulus Polyethylene) fiber developed by Royal DSM N.V (Netherlands). These cables (or ropes) for example have a maximum strength of 333,000 N which means this type of cable can withstand a tensile force of 33 tons. Alternative cables can be used depending on the intended application.

The rotating carrier 130 is configured to support at least two soil rippers. In the embodiment shown in FIG. 1-2B, the rotating carrier supports four rippers 140 located at respective radial positions on the rotating carrier. As a result, a single rotating carrier can establish an intertwined cable network having a maximum width that corresponds to the maximum spacing between at least two rippers. Each soil ripper 140 is mounted to the carrier near a top-end of the ripper and extends away from the carrier down toward the ground in the vertical direction, which refers to the direction that is generally perpendicular to the ground surface and the direction of forward travel. It should be understood that the term ripper is intended to refer to any soil ripping or plow-like device suitable for penetrating the ground to a suitable depth and plowing through the ground so as to incrementally feed out cable beneath the soil surface directly and without removing the soil. Preferably, the ripper is shaped such that it provides suitable ground ripping and cable deploying functionality and such that the ripper passively maintains a proper orientation for deploying cable irrespective of the rotational motion of the carrier. For example, rippers having a fin shape could be utilized that passively maintain the ripper generally in alignment with the vehicle's forward travel direction despite the rotating carrier moving the ripper from side to side as further described herein.

Figure 4A:
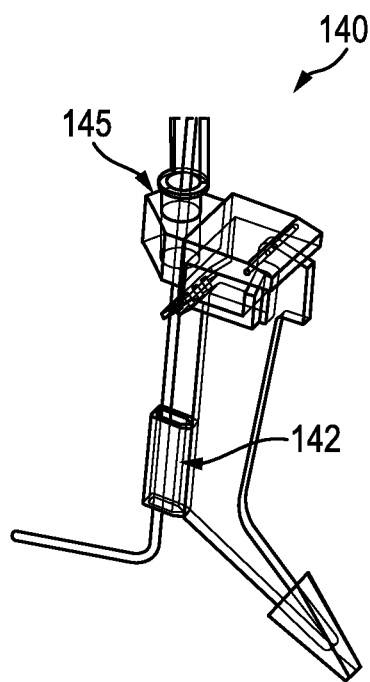
FIG. 4A is a perspective view diagram of an exemplary soil ripper cable delivery device for subsoil delivery of one cable according to an embodiment.

Each soil ripper 140 is equipped with one or more guides 142 that allow cables to be fed from the cable supply spool 150, which is positioned near the top-end of the ripper, down through the guide and out behind the ripper at a depth underground. According to a salient aspect of the proposed invention, the rippers are rotatably mounted to the rotating carrier by, for example, a cylinder/cylinder mount connection 145, thereby providing rotational freedom for each ripper. In the exemplary embodiment, the rippers have no axial freedom relative to the carrier 130. As such, as the rotating carrier rotates 130, each soil ripper follows the rotation while remaining parallel to the vehicle's direction of travel. This facilitates ripping. FIG. 4A illustrates the exemplary soil ripper 140 having a single guide 142 for feeding a single cable. FIG. 4A also illustrates the exemplary cylinder-cylinder connection 145 for rotatably connecting the ripper to the carrier 130. As would be understood, various mount configurations, such as bearings or bushings, can be used to mount the ripper to the carrier to and provide the ripper with at least a minimum degree of rotational freedom suitable for maintaining the ripper in a preferred alignment relative to the general direction of vehicle travel and irrespective of the rotation of the carrier.

Figure 2B:
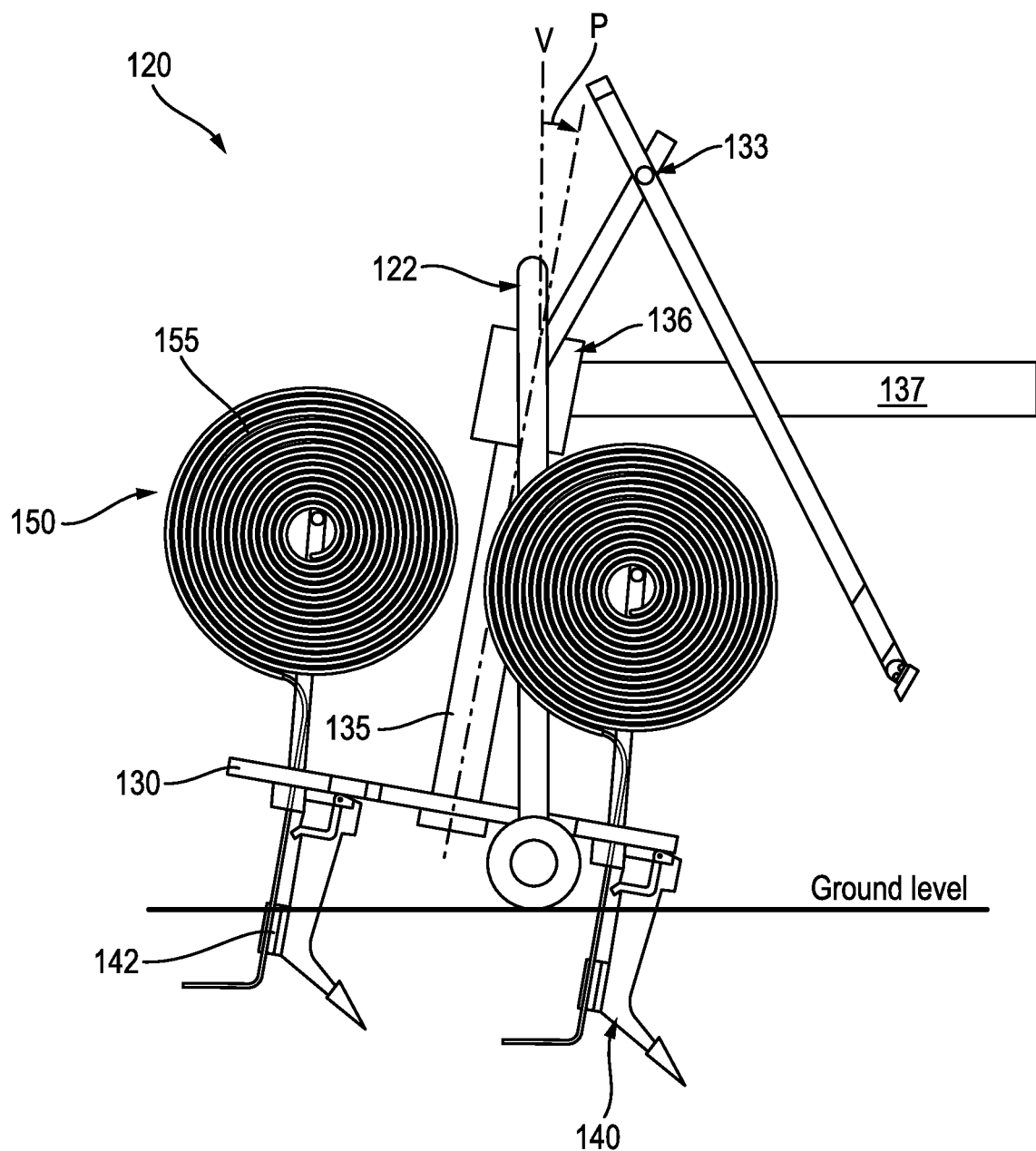
FIG. 2B is a side view diagram of the exemplary apparatus for subsurface cable insertion of FIG. 2.

Returning to FIGS. 1-2B, the rotating carrier 130 rotates around the axis defined by a rotating shaft 135. The rotation is forced though a power transmission unit 136, which as shown in FIGS. 1-2B, includes system of mechanical power transmission shafts 137 for receiving power from the towing vehicle and transferring that power into rotation of the rotating shaft 135 and carrier 130. As would be understood, the power transmission unit can include other or additional known power transmission components that are commonly used in vehicles or heavy equipment for controlling and transferring mechanical power, such as gears, belt drives, shafts, joints, clutches, motors, speed controllers and the like.

The subsoil intertwiner 120 can be configured such that the angle of the rotating shaft, p, (also the axis of rotation for the carrier 130) with respect to the vertical axis, v, can be controllably varied to define a "penetration angle," p, having an angle between 10 and 45 degrees, for example. As shown, the rotating carrier 130 is a generally planar structure and the height and angle of the carrier 130 and the plane of rotation for the carrier and supported rippers relative to the ground can be controllably adjusted using a lever/linkage system 133 connected to the vehicle 105 and the chassis/stabilizer 122.

In operation, the combination of the vehicle movement in the direction of travel and the rotation of the rotating carrier whilst feeding out the cables via the rippers 140 serves to place an underground pattern of intertwined cables. The axis of rotation for the rotating shaft (also referred to as the penetration angle, p) can be varied from the vertical axis, v, which allows the cables to entangle and results in the sub-surface deployment of an intertwined network of cables, as further described below in connection with FIG. 5A.

Figure 4B:
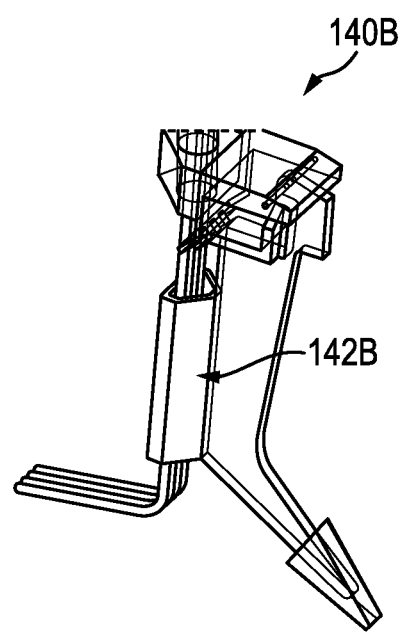
FIG. 4B is a perspective view diagram of an exemplary soil ripper cable delivery device for subsoil delivery of four grouped cables according to an embodiment.
Figure 4C:
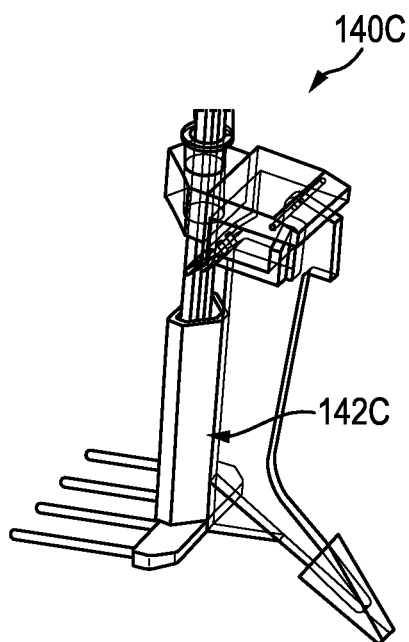
FIG. 4C is a perspective view diagram of an exemplary soil ripper cable delivery device for subsoil delivery of four spaced apart cables according to an embodiment.

Variations to the exemplary subsoil intertwiner 120 configuration can be implemented to achieve different cable network structures having particular protective properties. For example, as shown in FIGS. 4B-4C the rippers can be configured to include systems for multi-cable delivery, rather than a single cable delivery configuration shown in FIG. 4A. For example, FIG. 4B is a perspective view diagram of an exemplary soil ripper cable delivery device 140b configured for subsoil delivery of four grouped cables, wherein the guide 142b is configured to feed out the group of four cables at the same depth underground and in a side-by-side arrangement. By way of further example, FIG. 4C is a perspective view diagram of an exemplary soil ripper cable delivery device 142c, wherein the guide 142c is configured to feed out the four cables at the same depth but spaced apart in the width-wise direction.

Figure 3A:
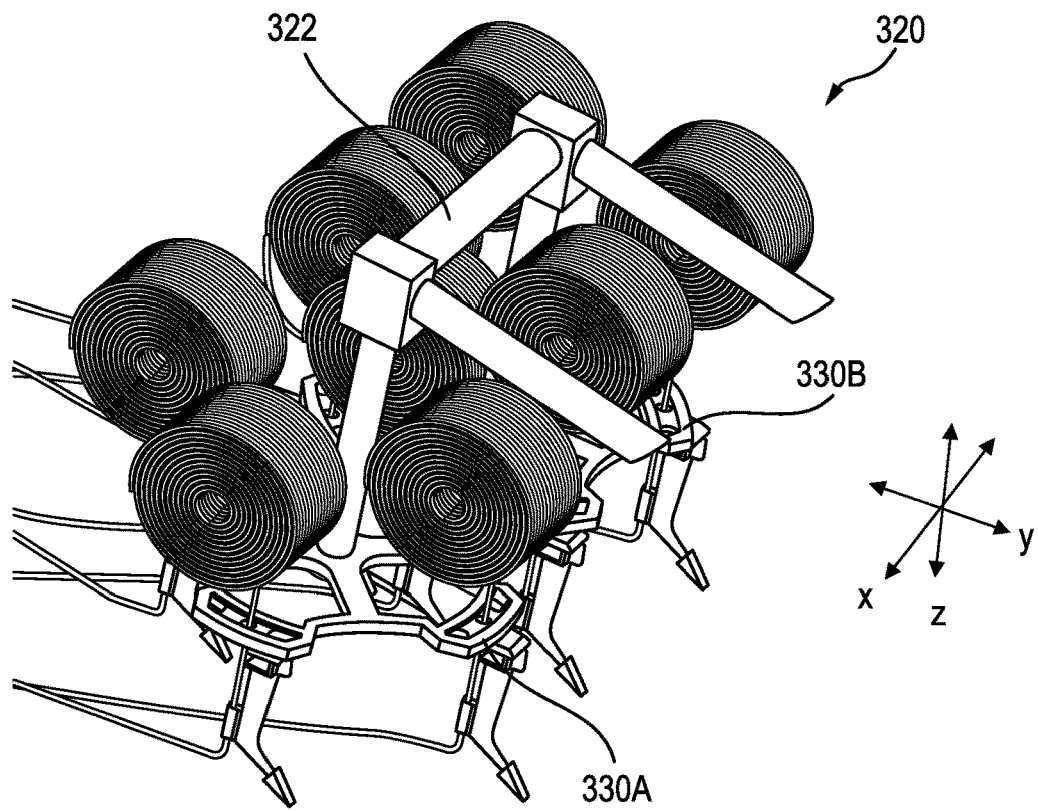
FIG. 3A is a perspective view diagram of an exemplary apparatus for subsurface cable insertion according to an embodiment.
Figure 3B:
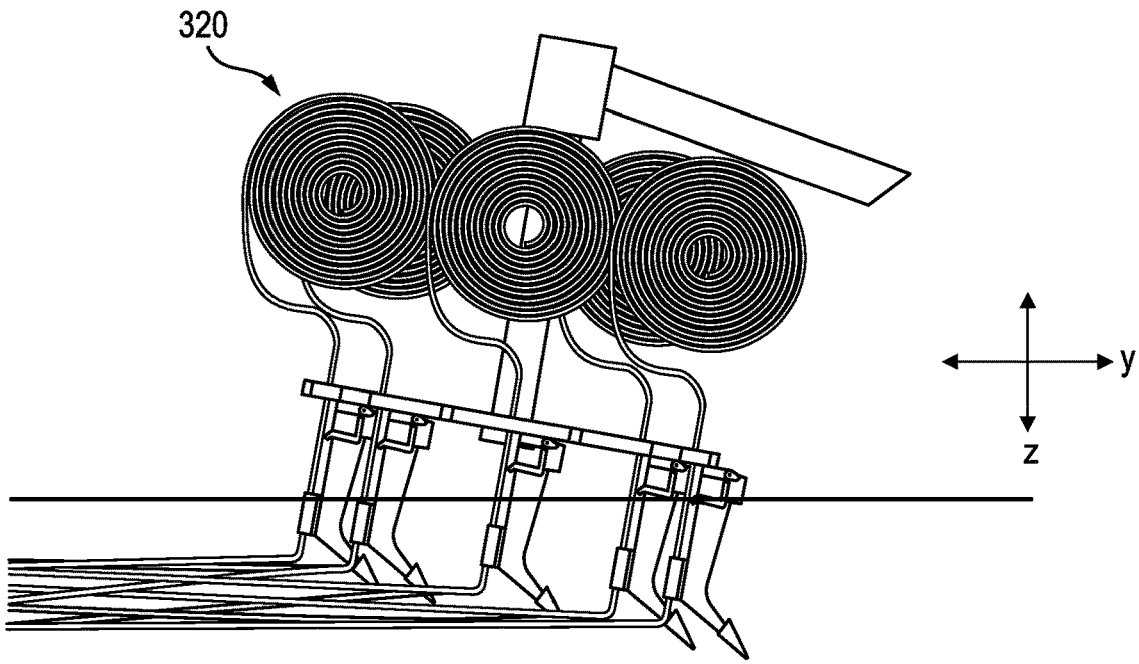
FIG. 3B is a side view diagram of the exemplary apparatus for subsurface cable insertion of FIG. 4A.
Figure 3C:
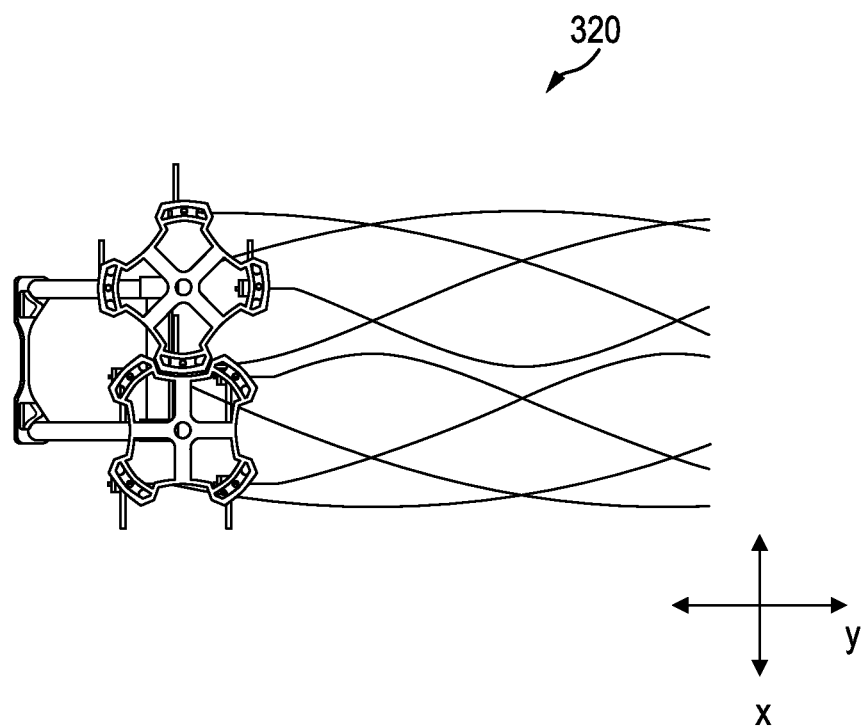
FIG. 3C is a top view diagram of the exemplary apparatus for subsurface cable insertion of FIG. 4A.
Figure 3D:
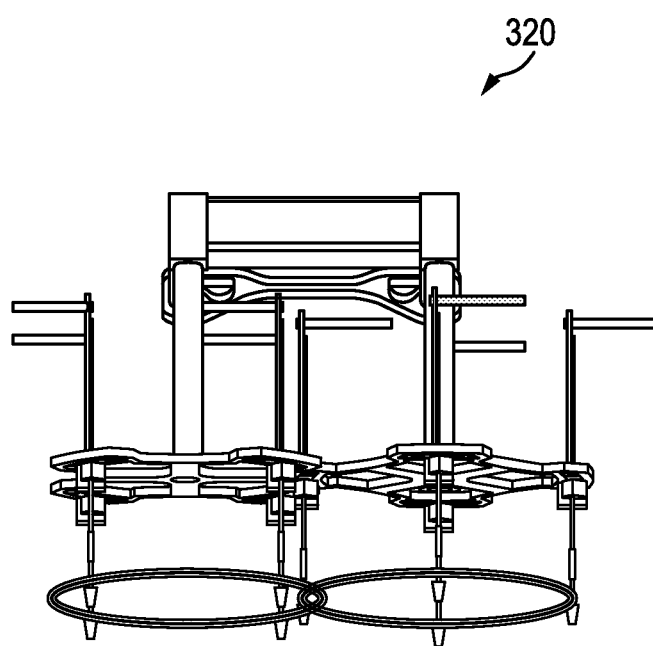
FIG. 3D is a front view diagram of the exemplary apparatus for subsurface cable insertion of FIG. 4A.

Other possible variations to the basic subsoil intertwiner configuration can include combining multiple rotating subsoil intertwiners to provide a wider and more complex intertwined cable structure. For example, FIG. 3A is a perspective view diagram of an exemplary apparatus for subsurface cable insertion 320 according to an embodiment that includes two counter-rotating carriers 330a and 330b. FIG. 3B is a side view diagram of the exemplary apparatus for subsurface cable insertion of FIG. 3A. FIG. 3C is a top view diagram and FIG. 3D is a bottom-front perspective view diagram of the exemplary apparatus for subsurface cable insertion of FIG. 3A, wherein the cable spools have been omitted. As shown in FIGS. 3A-3D, the double-counter-rotating delivery device 320 comprises two of the subsoil delivery devices described above that are arranged side-by-side. The two subsoil delivery devices can be linked, for instance, supported by the same chassis structure 322. Additionally, the two subsoil delivery devices can be driven by one or more power transmission units such that they are configured to counter rotate in sync.

As noted, in operation, the combination of the vehicle movement in the direction of travel and the rotation of the rotating carrier while feeding out the cables via the rippers 140 provides an underground pattern of intertwined cables. Furthermore, the axis of rotation for the rotating shaft (penetration angle, p) can be varied from the vertical axis, v, which allows the cables to entangle and facilitates the sub-surface deployment of an intertwined network of cables, as further described below in connection with FIG. 5A.

Furthermore, it can be appreciated that the configuration of the subsoil intertwiner(s) and other operating parameters, such as the rate at which the cables are laid, penetration angle and rotation speed, can be defined to achieve different protective cable network configurations, cable density and other protective structure features. As would be understood, these parameters can be set prior to operation of the system and/or dynamically adjusted during operation. As would be understood, computer, electronic and/or mechanical control systems can also be used to set and adjust the operating parameters of the system 100.

For instance, the system 100 can include a control computer (not shown) that interfaces with other electronic and electro-mechanical devices (not shown) that facilitate coordinated operation of the subsoil intertwiner 120 and the vehicle 105. The control unit can be any suitable computing device and can include a power source (e.g., battery) a processor, a user interface (e.g., a display and user input devices like keyboards, touchscreen interface and other such input devices), a non-transitory computer readable storage medium such as computer memory or a computer hard drive. The control unit can also include instructions in the form of software code stored in the storage medium and that is executable by the processor. The instructions, when executed by the processor, can configure the control unit to control the operation of the subsoil intertwiner and vehicle by processing sensed data, processing stored instructions, and/or processing control instruction received from a system operator either prior to or during operation of the system. The control unit further include various analog and digital input and output connections that enable the control unit to interface with other electronic devices that facilitate operation of the subsoil intertwiner and/or the vehicle. For example, the other electronic components can include position sensors for measuring the orientation, angle, acceleration, rotational speed and/or position of the rotating carriage 130. The control unit can also interface with the vehicle power transmission unit to control the speed of the rotation of the carriage as well as the speed of the vehicle in the direction of travel. The control unit can also interface with the cable feeding devices to control the speed at which the cables are fed out underground as a function of the speed of vehicle and rotational speed of the carriage.

Features and functionality of the exemplary underground asset protection systems comprising the protective network of intertwined high-strength polymer cables and the methods for creating such protection systems using the exemplary embodiments of the subsoil intertwiner apparatuses will be further appreciated in view of the following discussion of the exemplary cable networks illustrated in FIGS. 5A-7B and with continued reference to FIGS. 1-4C.

Figure 5A:
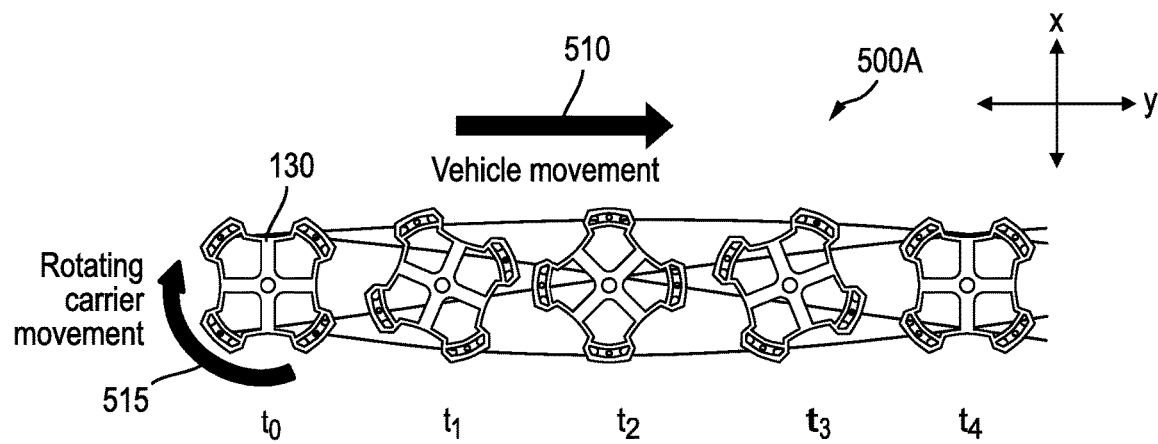
FIG. 5A is a schematic diagram showing an exemplary configuration of intertwined cables delivered into the ground according to an embodiment.
Figure 5B:
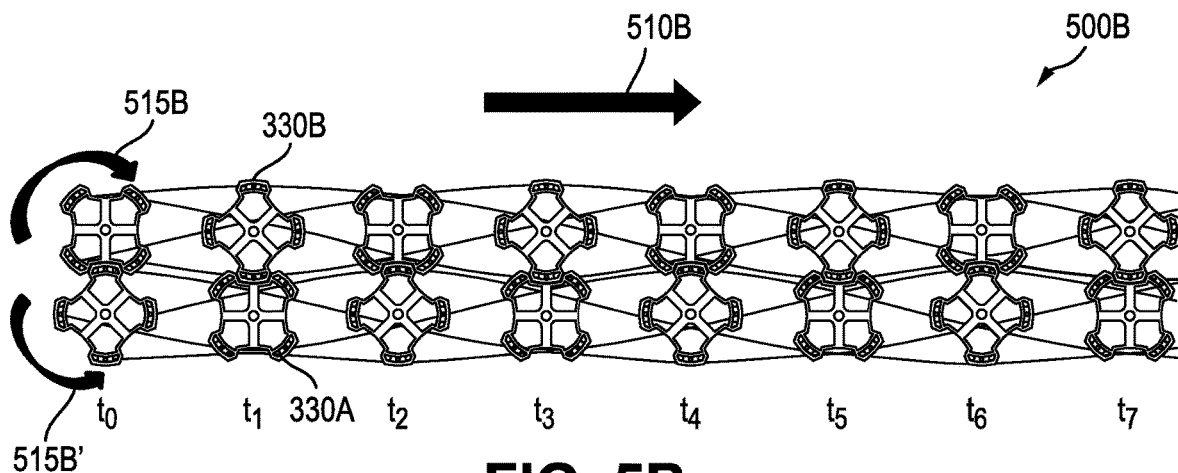
FIG. 5B is a schematic diagram showing an exemplary configuration of intertwined cables delivered into the ground according to an embodiment.
Figure 5C:
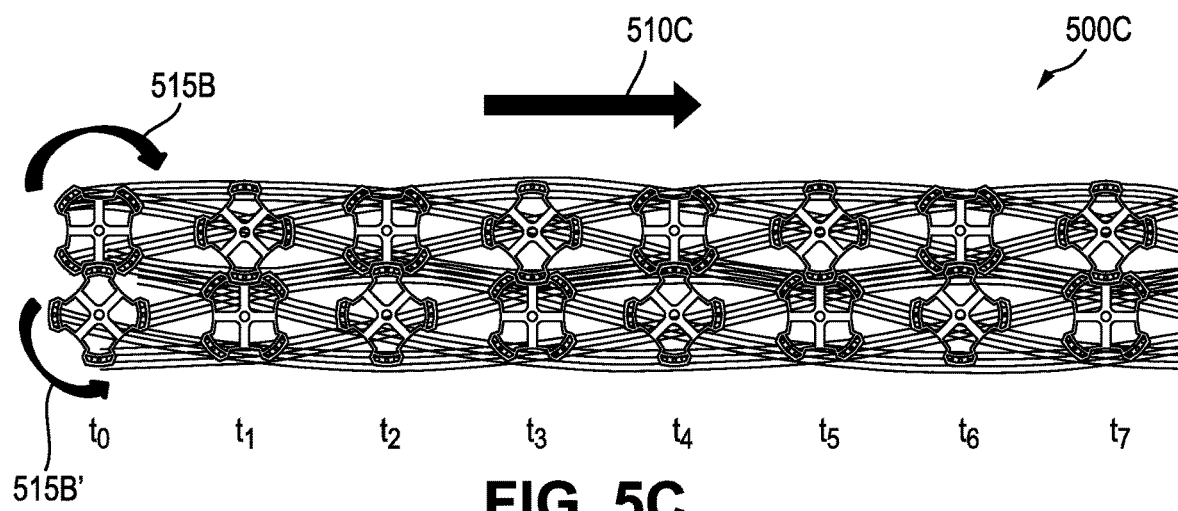
FIG. 5C is a schematic diagram showing an exemplary configuration of intertwined cables delivered into the ground according to an embodiment.

FIG. 5A is a conceptual top-view illustration of the subsurface cable network 500A resulting from the combined vehicle movement in the direction of travel 510 and rotational movement 515 of the single rotating carrier 130 of the subsoil intertwiner 120 described in connection with FIGS. 1A-2C. FIG. 5A shows the rotational position of the carrier 130 and location of the four cables deployed by respective rippers (not shown) at time intervals t0-t4. FIG. 5B is a similar conceptual illustration of the subsurface cable network 500B resulting from the combined vehicle movement in the direction of travel 510B and counter rotational movement 515B and 515B' of the two carriers 330B and 330A of the exemplary subsoil intertwiner 320 shown and described in connection with FIGS. 3A-3D. FIG. 5A also shows the rotational position of the carriers and location of the cables deployed by respective rippers (not shown) at time intervals t0-t7. FIG. 5C is a similar conceptual illustration of the subsurface cable network 500B resulting from the combined vehicle movement in the direction of travel 510C and counter rotational movement 515C and 515C' of the two carriers 330B and 330A of the exemplary subsoil intertwiner 320 shown and described in connection with FIGS. 3A-3D, but modified to include rippers each configured for subsoil delivery of four cables each, as shown and described in connection with FIG. 4B or FIG. 4C.

The establishment of an underground protective cables network having a prescribed density, entanglement and space between cables can be controlled by setting of one or more of a variety of parameters. The density of the underground weaving configuration of the cable network, for example, can be defined by subsoil intertwiner configuration parameters, and dynamic operational parameters. Configuration parameters can include, for example: the number and rotating carrier(s); the diameter of the rotating carrier(s); penetration angle (p), which can define the path of the rippers in one or more of the x-y and z directions; number of soil rippers; number of high strength cables per soil ripper and, where multiple cables are fed out by a ripper, the spacing of the cables in one or more directions; and the radial position of the soil rippers on the rotating carrier relative to the rotational axis, which defines the spacing of the soil rippers in one or more directions (e.g., x and y). Dynamic operational parameters can include, for example: speed of the vehicle towing the subsurface delivery system; and rotation speed of the rotating carrier.

Figure 6:
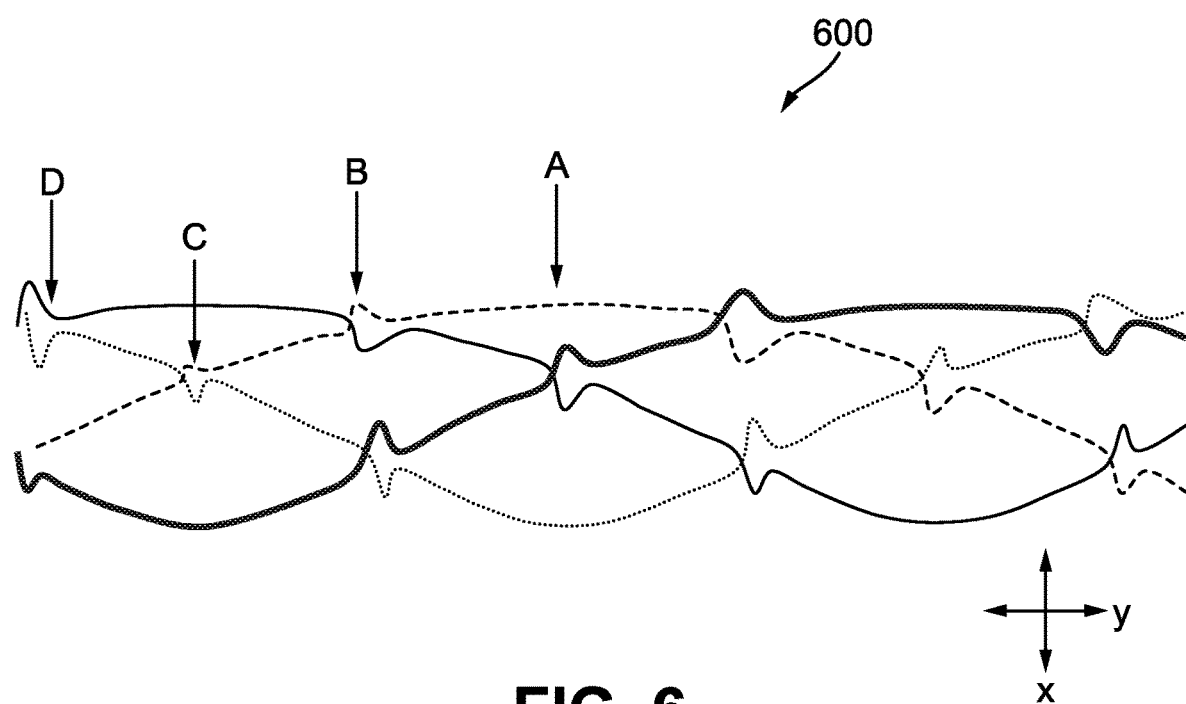
FIG. 6 is a schematic diagram illustrating the protective function provided by an exemplary configuration of intertwined cables according to an embodiment.

FIG. 6 provides a two-dimensional top-view illustration of a network of cables 600 laid, for example, using the four-cable, single rotative carrier configuration shown and described in connection with FIGS. 1A-2C and shown in FIG. 5A. FIG. 6 conceptually illustrates the entanglement points within the deployed network in practice. As shown, a vertical pressure at point A will translate into a vertical opposite reaction force and an increase friction force at point B and point C.

The underground network presents numerous points of entanglement, which means that each motion imposed to one cable, will cause this cable to get in contact with another cable located underneath the first cable. The second will provide a reaction force (vertical and tangential due to increased friction force). as which will be transferred to the first cable and ultimately to the excavator bucket. As can be appreciated, when used as a protective barrier, the effort exerted by an excavator on one protection cable has the effect of moving the cable and resistance from the friction of the cable surface while the soil opposes this movement. In order to further assist in limiting the horizontal motion of a cable, cables can also be anchored at their respective extremities.

Figure 7A:
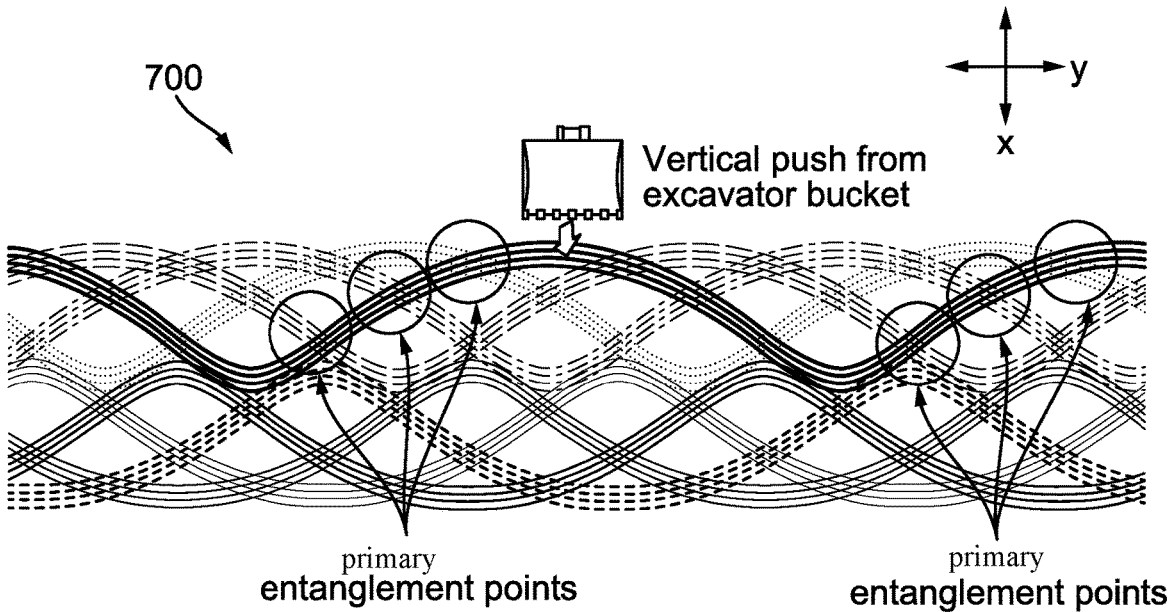
FIG. 7A is a schematic diagram illustrating the protective function provided by an exemplary configuration of intertwined cables according to an embodiment.
Figure 7B:
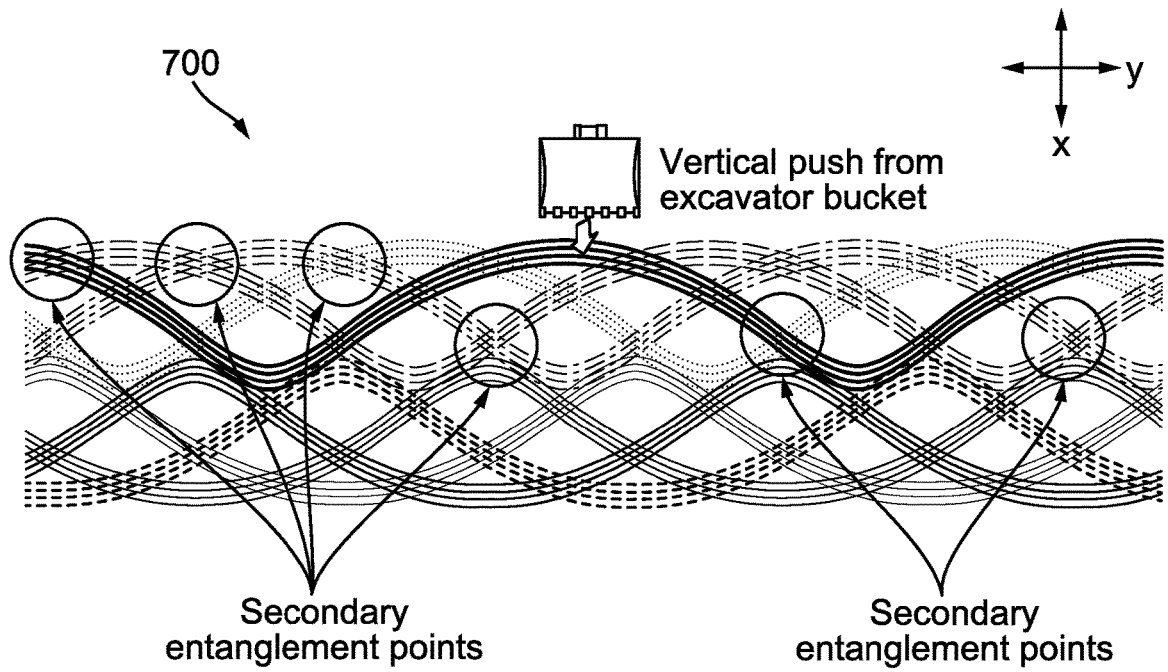
FIG. 7B is a schematic diagram illustrating the protective function provided by an exemplary configuration of intertwined cables according to an embodiment.

FIGS. 7A and 7B similarly illustrate the entanglement points between cables within an exemplary network of cables 700 that is similar to the network shown in FIG. 5C. FIG. 7A illustrates, for example, primary entanglement points (circled) within the network 700 that are stressed when a vertical pushing force from an excavator bucket is applied on the network at the location identified by the arrow. FIG. 7B illustrates, for example, secondary entanglement points (circled) within the network 700 that are stressed when a vertical pushing force from an excavator bucket is applied on the network at the location identified by the arrow. It is thus expected that loading a cable of the network will lead to some deformation of the cable network, however the reaction force to this deformation increases exponentially as the number of entanglement points that are activated increases. As a result, the greater the penetration force of the digger bucket, the larger the reaction force provided by the network. As can be appreciated, the protection provided by a network increases as a function of the density of the network. However, in practice and depending on the application requirements, increasing the density of the network is not always necessary or worthwhile. In many applications, the effect of entanglement of even a relatively lower density cable network can often provide suitable protection for buried assets. Moreover, a higher density network requires more cabling and a subsoil delivery system with many more rippers can result in a lower execution time and require more energy to rip the ground. Accordingly, the exemplary embodiments described herein provide systems and methods for subsurface delivery of a protective cable network that can be adapted to suit the specific requirements of the application (e.g., desired protective properties of the network) in view of practical limitations and costs.

As noted, various parameters and mathematical relationships define the respective positions of the cables deployed using the exemplary systems and the resulting protective cable network. More specifically, the underground position of each cable is driven by the trajectory of the corresponding cutter and the trajectory of each cutter depends on:

a=radius of rotating carrier (e.g. 0.8 m)
b=rotation speed of the carrier (e.g. 0.25 rad/s)
c=speed of the truck (e.g. 0.5 m/s)
d=Y coordinate of carrier's center (e.g. 0.8 m)
e=maximum vertical distance between cables (e.g. 0.15 m). tis parameter is driven by the angle of the rotating shaft with the vertical axis.
f=average depth for cables installation (e.g. −0.5 m) $\varphi_1$, $\varphi_2$ and $\varphi_3$=constants defining the angular position of one cutter with respect to the rotating carrier center, at to.

The resulting 3D parametric equation for one cable is expressed as:

$$f(X, Y, Z) = \begin{matrix} X = a*\cos(b*t + \varphi_1) + c*t \\ Y = d + a*\sin(b*t + \varphi_2) \\ Z = -e*\sin(b*t + \varphi_3) + f \end{matrix}$$

Extending this example to model the location of two intertwining cables deployed using one rotative carrier where the respective rippers are spaced apart 180 degrees on the single carrier, the position of cable 1 and 2 are expressed by the following sets of equations.

Cable 1

$X=0.8*\cos(0.25*t-pi/4)-0.5*t$ $Y=0.8+0.8*\sin(0.25*t-pi/4)$ $Z=-0.15*\sin(0.25*t+pi/4)$ Cable 2

Figure 8A:
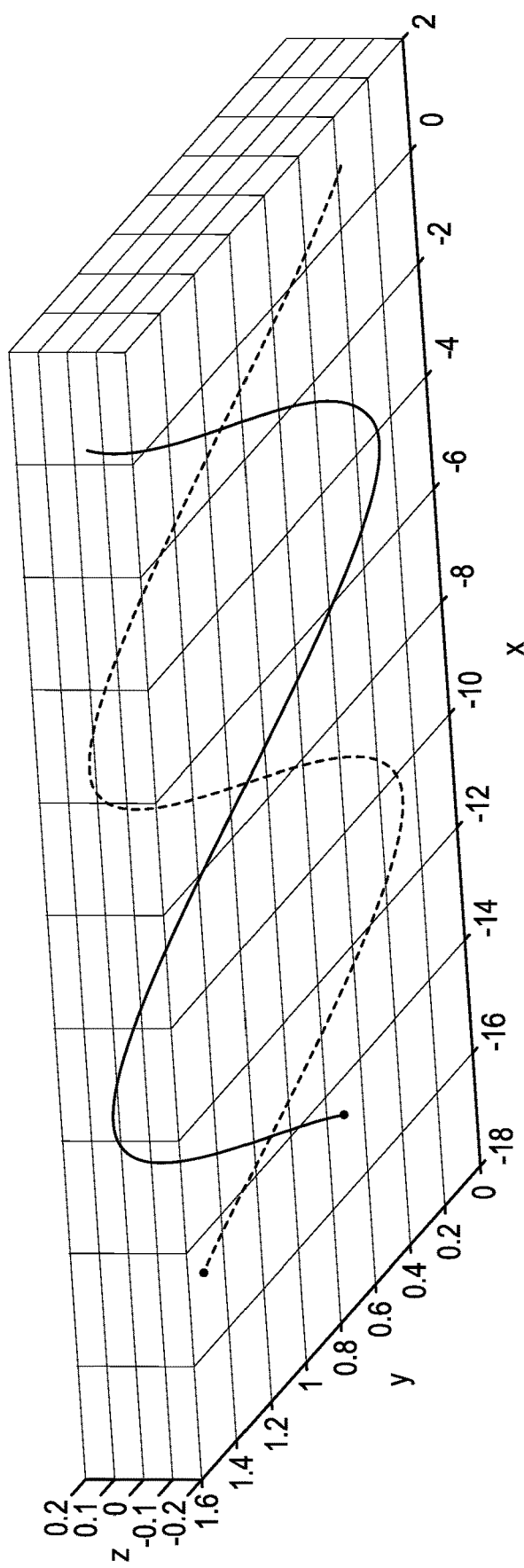
FIGS. 8A-8B are charts graphically illustrating the respective position of cables within a cable network deployed using an exemplary set of system parameters according to an embodiment.
Figure 8B:
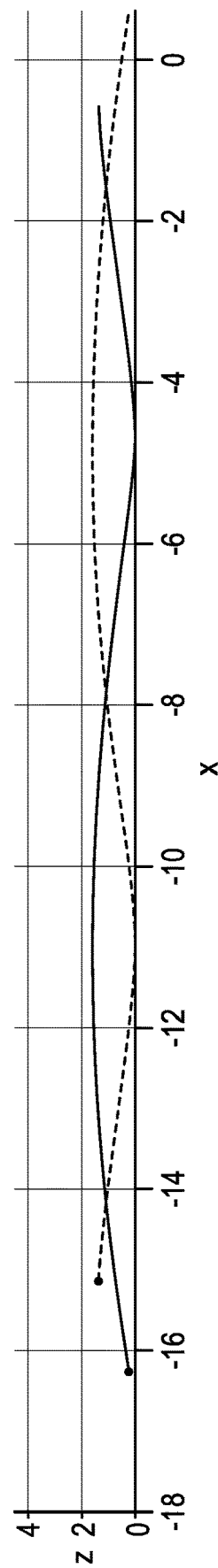

$X=0.8*\cos(0.25*t+3*pi/4)-0.5*t$ $Y=0.8+0.8*\sin(0.25*t+3*pi/4)$ $Z=-0.15*\sin(0.25*t+5*pi/4)$ FIG. 8A is a chart graphically illustrating the respective position of exemplary cables 1 and 2 in the x, y and z axis, as deployed according to the aforementioned parameters. FIG. 8B is a chart graphically illustrating the position of exemplary cables 1 and 2 in z axis (i.e., depth), as deployed according to the aforementioned parameters.

Figure 9A:
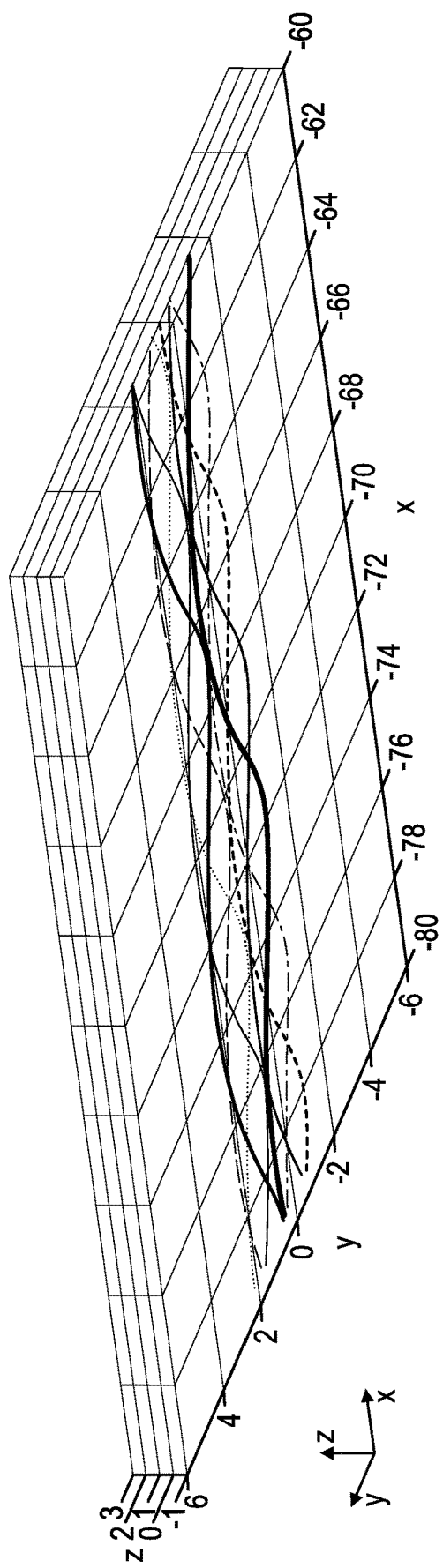
FIGS. 9A-9C are charts graphically illustrating the respective position of cables within a cable network deployed using an exemplary set of system parameters according to an embodiment.
Figure 9B:
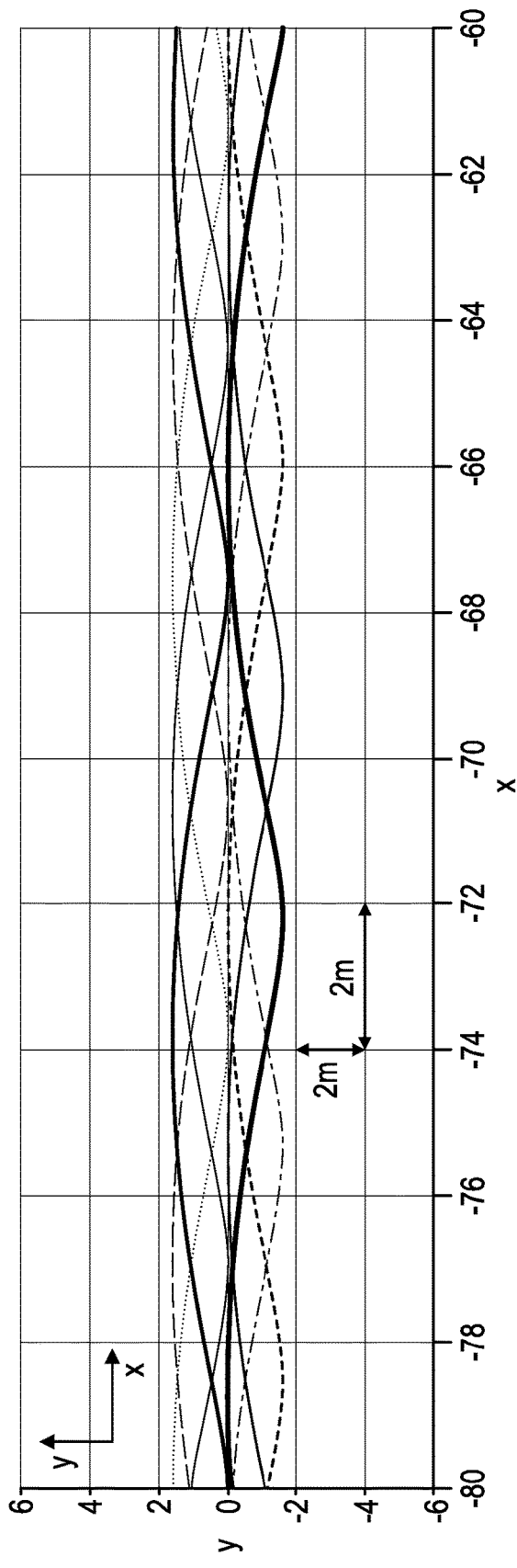
Figure 9C:
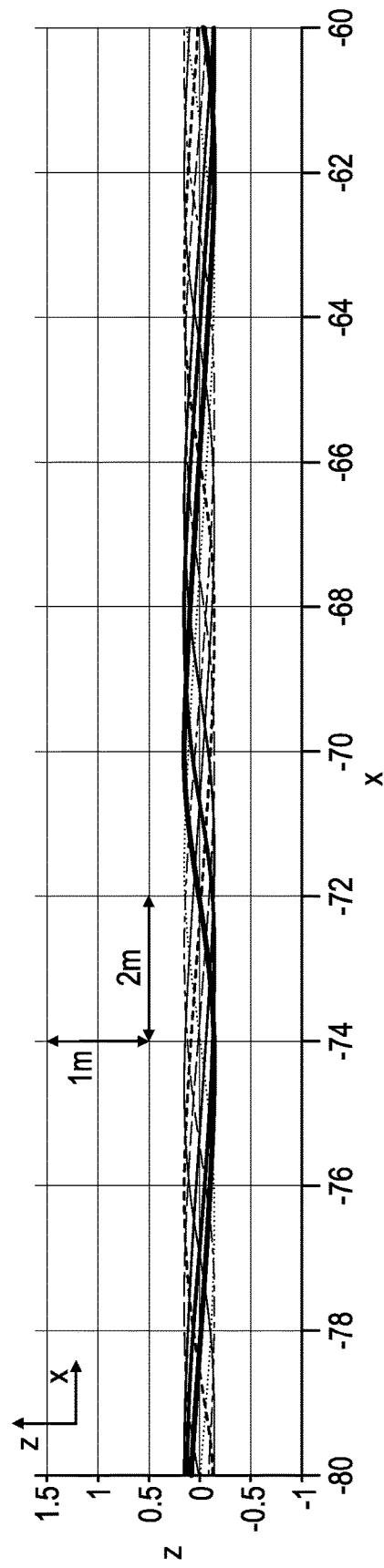

FIGS. 9A-9C are charts graphically illustrating the respective position of cables within an exemplary cable network formed using a two rotating carrier system in which both carriers are rotated in the same rotational direction and wherein each carrier supports four evenly spaced cable-deploying rippers. In this particular example, carriers 1 and 2 are operated according to the following parameters: Carrier 1 (a=0.8 m; b=0.25 rad/s; c=0.5 m/s; d=0.8 m; e=0.15 m; f=−0.5 m) and Carrier 2 (a=0.8 m; b=0.25 rad/s; c=0.5 m/s; d=0.8 m; e=0.15 m; f=−0.5 m). FIG. 9A is a chart graphically illustrating the respective position of the eight cables, in the x, y and z axis, as deployed according to the aforementioned parameters. FIG. 9B is a chart graphically illustrating the position of the cables in the x-y axis, as deployed according to the aforementioned parameters. FIG. 9C is a chart graphically illustrating the position of the cables in the z axis (i.e., depth), as deployed according to the aforementioned parameters.

Figure 10A:
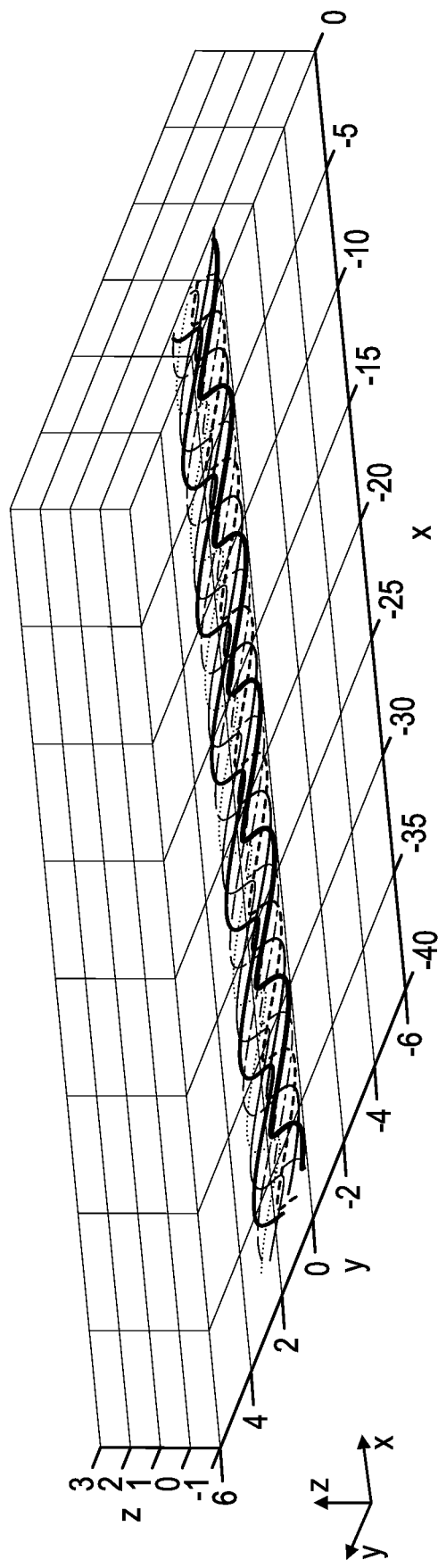
FIGS. 10A-10C are charts graphically illustrating the respective position of cables within a cable network deployed using an exemplary set of system parameters according to an embodiment.
Figure 10B:
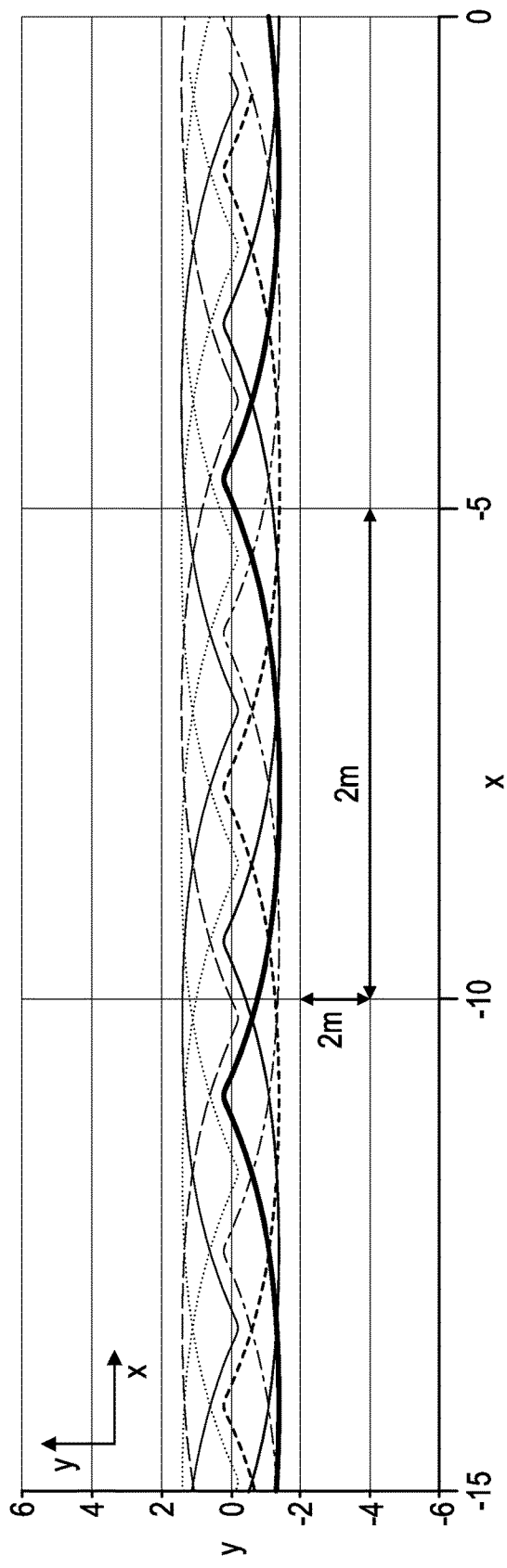
Figure 10C:
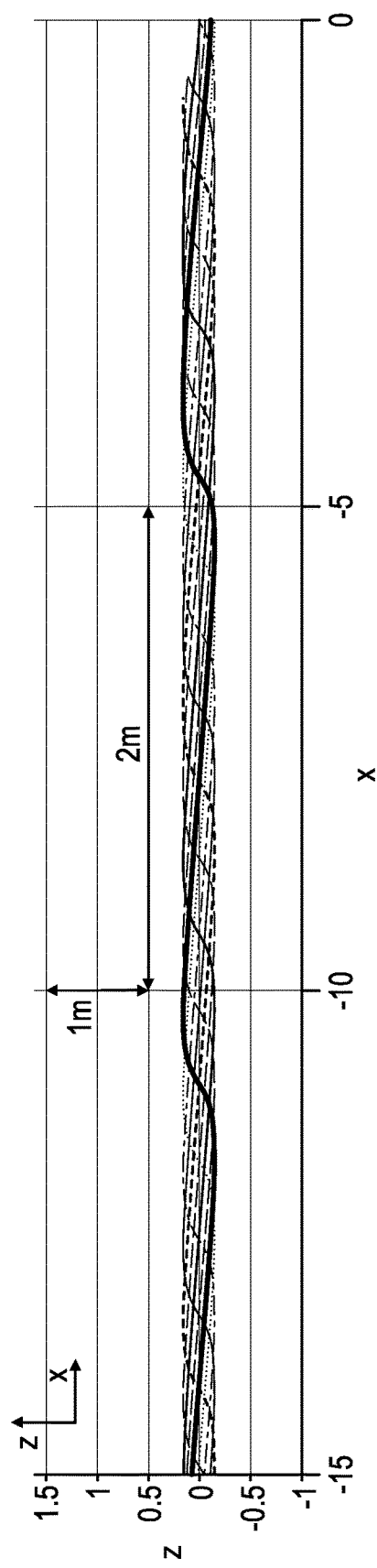

FIGS. 10A-10C are charts graphically illustrating the respective position of cables within an exemplary cable network formed using a two rotating carrier system in which the carriers are counter-rotated and wherein each carrier supports four evenly spaced cable-deploying rippers. In this particular example, carriers 1 and 2 are operated according to the following parameters: Carrier 1 (a=0.8 m; b=0.25 rad/s; c=0.25 m/s; d=0.6 m; e=0.15 m; f=−0.5 m) and Carrier 2 (a=0.8 m; b=−0.25 rad/s; c=0.25 m/s; d=−0.6 m; e=0.15 m; f=−0.5 m). FIG. 10A is a chart graphically illustrating the respective position of the eight cables, in the x, y and z axis, as deployed according to the aforementioned parameters. FIG. 10B is a chart graphically illustrating the position of the cables in the x-y axis, as deployed according to the aforementioned parameters. FIG. 10C is a chart graphically illustrating the position of the cables in the z axis (i.e., depth), as deployed according to the aforementioned parameters.

The example simulations described above in connection with FIGS. 8A-10C, illustrate that the parametric function f(X,Y,Z) is usable to model the network pattern as a function of various device configuration and operational speed parameters. It can be further appreciated that the controllable variables allow for adjusting the cable pattern to the desired functionality. For instance, a lower vehicle speed, c, results in a denser underground network. See for example, the example illustrated in FIGS. 9A-9C (c=0.5 m/s) versus the example illustrated in FIGS. 10A-10C (c=0.25 m/s). Additionally, an interlocking rotative carrier, as shown in FIG. 8A, allows to reduce parameter d, increasing the density of the network, while narrowing the width of the protection network. It can be further appreciated that counter rotative carriers allow to define a quasi-symmetric pattern (see e.g., FIGS. 10A-10C).

At this juncture, it should be noted that although much of the foregoing description has been directed subsurface cable delivery systems and methods for protecting buried assets, the systems and methods disclosed herein can be similarly deployed and/or implemented in scenarios, situations, and settings far beyond the referenced scenario for protecting buried assets.

It is to be understood that like numerals in the drawings represent like elements through the several figures, and that not all components and/or steps described and illustrated with reference to the figures are required for all embodiments or arrangements.

The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s). It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An apparatus for trenchless delivery of a protective network of intertwined cables beneath a surface of ground, the apparatus comprising:
   a chassis configured to be mounted to a vehicle that, during operation, traverses the ground surface in a direction of travel;
   a rotating carrier supported by the chassis, wherein the rotating carrier is configured to rotate in a first rotational direction about a rotational axis extending generally in a normal direction relative to the ground surface; and
   at least two soil rippers, each soil ripper having a top end mounted to the rotating carrier and extending away from the rotating carrier in a downward direction to a bottom end, wherein, during operation, the rotating carrier is maintained above the ground surface and the soil rippers are configured to penetrate the ground surface and plow through the ground in the direction of travel, and wherein each soil ripper includes:
      a cable-feeding guide configured to receive a cable from a cable supply provided near the top end of the soil ripper and feed the cable out at a point near the bottom end of the soil ripper, whereby the soil ripper incrementally feeds out the cable at a depth beneath the ground surface as the soil ripper plows through the ground in the direction of travel, and whereby rotation of the rotating carrier and soil rippers and movement of the apparatus in the direction of travel interweaves the cables deposited by respective soil rippers and forms the protective network of intertwined cables.

2. The apparatus of claim 1, further comprising: a supporting linkage connecting the chassis to the vehicle, wherein the linkage is configured to controllably move the chassis in a vertical direction relative to the vehicle and the surface of the ground and thereby control the depth of the soil rippers and the cables delivered underground by the soil rippers.

3. The apparatus of claim 2, wherein the supporting linkage is configured to controllably adjust the rotational axis of the rotating carrier relative to the ground and thereby adjusts the relative height of the respective cables deposited by the at least two soil rippers.

4. The apparatus of claim 2, wherein the soil rippers are spaced apart in at least a width-wise direction that is perpendicular to the direction of travel and the vertical direction.

5. The apparatus of claim 1, further comprising a power transmission unit configured to rotate the rotating carrier in the first rotational direction at a prescribed rotational speed.

6. The apparatus as in claim 1, wherein the soil rippers are rotatably mounted to the rotating carrier such that the soil rippers have rotational freedom about an axis extending generally in a vertical direction and thereby remain aligned in relation to the direction of travel irrespective of rotation of the rotating carrier.

7. The apparatus as in claim 6, wherein the soil rippers are mounted to the rotating carrier by a respective cylinder-to-cylinder connection.

8. The apparatus of claim 1, further comprising a second rotating carrier mounted to the chassis, wherein the second rotating carrier is configured to counter-rotate relative to the first rotational direction.

9. The apparatus of claim 1, wherein the soil ripper includes a cable feeding guide configured to receive a respective plurality of cables from the cable supply and feed the respective plurality of cables out at the depth beneath the ground surface.

10. A method for trenchless delivery of a protective underground network of intertwined cables beneath a surface of ground, comprising:
   moving, with a vehicle traversing the ground surface in a direction of travel, a plurality of soil rippers through the ground in a direction of travel, wherein the soil rippers are configured to penetrate the ground surface and plow through the ground, and wherein the soil rippers are supported by a rotating carrier at respective radial positions relative to a rotational axis of the rotating carrier; and
   during the step of moving the plurality of soil rippers through the ground in the direction of travel,
      rotating the rotating carrier about the rotational axis of the rotating carrier, wherein the rotational axis of the rotating carrier extends at least partially in a normal direction relative to the surface; and feeding out a plurality of cables under the surface of the ground using the plurality of soil rippers, wherein each soil ripper is configured to continuously feed out a respective cable, whereby rotation of the rotating carrier and soil rippers and movement in the direction of travel intertwines the cables deposited by respective soil rippers to form the protective underground network of intertwined cables.

11. The method of claim 10, wherein the plurality of cables is fed out at a rate that corresponds to a speed of moving in the direction of travel and rotational speed of the rotating carrier.

12. The method of claim 10, wherein the plurality of soil rippers is moved through the ground in the direction of travel at a speed defined by a prescribed cable network density.

13. The method of claim 12, wherein the rotating carrier is rotated at a rotational speed defined by the prescribed cable network density.

14. The method of claim 10, further comprising:
maintaining, the rotational axis of the rotating carrier at a prescribed angle relative to the normal direction while rotating the rotating carrier.

15. The method of claim 10, wherein the step of feeding out a plurality of cables comprises:
feeding out a respective plurality of cables by each soil ripper.

16. The method of claim 10, further comprising:
anchoring at least one cable among the plurality of cables at one or more ends thereof.

* * * * *